United States Patent [19]
Yoko et al.

[11] Patent Number: 5,381,339
[45] Date of Patent: Jan. 10, 1995

[54] OPERATION CONTROL APPARATUS OF WORKING SYSTEM

[75] Inventors: Hiroyoshi Yoko, Susono; Takashi Mizutani, Numazu; Nobuyuki Aiso; Hirotoshi Mochizuki, both of Mishima; Hirohiko Honda, Numazu, all of Japan

[73] Assignee: Toshiba Kikai Kabushiki Kaisha, Tokyo, Japan

[21] Appl. No.: 91,055

[22] Filed: Jul. 14, 1993

[30] Foreign Application Priority Data

Jul. 14, 1992 [JP] Japan .................. 4-187006

[51] Int. Cl.6 ............................................ G06F 15/46
[52] U.S. Cl. ..................................... 364/468; 364/478
[58] Field of Search ............... 364/468, 469, 478, 479; 29/568, 771, 783, 784, 430, 563, 33 P; 198/340, 341, 349

[56] References Cited

U.S. PATENT DOCUMENTS

| | | | |
|---|---|---|---|
| 4,646,245 | 2/1987 | Prodel et al. | 364/468 |
| 4,698,766 | 10/1987 | Entwistle et al. | 364/468 |
| 5,084,829 | 1/1992 | Kato | 364/468 |
| 5,214,588 | 5/1993 | Kaneko et al. | 364/468 |

*Primary Examiner*—Roy N. Envall, Jr.
*Assistant Examiner*—Thomas E. Brown
*Attorney, Agent, or Firm*—Fish & Richardson

[57] ABSTRACT

A working system comprises a machining center numerically controlled, a pallet stocker disposed in the vicinity of the machining center and storing a number of pallets therein, a preparatory station for setting-up work on a pallet, a conveying unit for automatically conveying the pallet from the pallet stocker to the preparatory station or the machining center, and a control apparatus for controlling an operation of the working system. The operation control apparatus comprises a control unit provided for the machining center and including a numerical control (NC) section executing instructions regarding various items on a working schedule and also including a MPU section executing a schedule data management, a preparatory operation board disposed in association with the preparatory station, a control board operatively connected to the control unit provided for the machining center and adapted to receive the conveying instructions to the pallets and the pallet status information, to transmit the pallet status displaying instruction and the pallet conveying operation execution instruction, and a movable control board provided in the conveying unit and adapted to receive the conveying operation execution instruction and to transmit an operation condition of the conveying unit to the control board. A pallet status display unit is further disposed in the control board and adapted to distinguish and display the status of the respective pallets independently in response to the pallet status display instruction from the control board.

3 Claims, 7 Drawing Sheets

[SCHEDULE TABLE]

| STATION NUMBER | PALLET NUMBER | SCHEDULE NUMBER | STATUS NUMBER | PROCESS NUMBER | FIRST PROCESS PROGRAM NAME | SECOND PROCESS PROGRAM NAME | FIXTURE OFFSET NUMBER | SHELF NUMBER |
|---|---|---|---|---|---|---|---|---|
| 19 | | | | | | | | |
| 11 | | | | | | | | |
| 21 | | | | | | | | |
| 81 | | | | | | | | |
| 10 | | | | | | | | |
| 20 | | | | | | | | |

OPERATION CONTROL APPARATUS OF WORKING SYSTEM

BACKGROUND OF THE INVENTION

The present invention relates to an operation control apparatus suitably applicable to a working system of a Flexible Manufacturing System (FMS) particularly provided with a number of pallets.

In the prior art, there is provided a working system having a pallet stocker in which a number of pallets are accommodated and a conveying unit such as conveying bogie for automatically conveying the pallets from the pallet stocker to a machining center 1. Such working system, as shown in FIG. 8, is further provided with a control unit 2 consisting of a Macro Processor Unit (MPU) and a Numerical Controlled (NC) section installed in the machining center for controlling the same, another control unit 4 for controlling the operation of the conveying unit 3 such as conveying bogie and a system controller 5 such as host computer connected to both the control units 2 and 4.

In this working system, the controls of inputting of a scheduled data, decision of working order of the pallets and pallet conveyance of the conveying unit 4 are performed.

As the pallet stocker, a loop type of a flat installation arrangement is widely utilized. The conditions or status of the pallets to be accommodated in the pallet stocker of this type are generally displayed through lighting, at the completion of a preparatory operation, of display lamps arranged in a row on a pallet display section provided on a surface of a cathode ray tube (CRT) of a control unit of the machining center and a preparatory board, Further, in an FMS provided with a multi-layered type pallet stocker and a system controller such as host computer, the status or conditions of the pallets are displayed on the system controller. As described above, there is no prior art system which is equipped with a display unit which can independently display only the conditions of the pallets.

However, the following problems have been provided in the operation control apparatus of the conventional working system of the structures described above.

1. The control system has a complicated structure and hence has a long access time. That is, various kinds of data communications are executed between the control unit 2 of the machining center 1 and the system controller 5 and between the control unit for the conveying unit 3 and the system controller 5, and instructions for the conveyance are outputted in response to these data communications, so that signal processing time for function generation is elongated.

2. Much time is required for the maintenance of the working system. For example, when the conveying unit 3 is stopped during the scheduled operation, it is necessary to judge whether the cause of this operation stop is based on the machining center 1, conveying unit 3 or the system controller 5. This judgement requires relatively long time, resulting in the lowering of productivity. Moreover, re-setting of the scheduled data and returning of the respective units or apparatus to the initial states will have to be done after performing a countermeasure against the stopping of the conveying unit 3.

3. It is impossible to execute an interrupt instruction of the pallet. That is, even in a case where an optional pallet is urgently required to be used, such pallet cannot be used during the scheduled operation without interrupting the scheduled operation.

Furthermore, as mentioned above, the conventional working system is not provided with a pallet status display unit independently displaying only the status or condition of the pallet. For this reason, there is a strong desire to develop a pallet status display unit for surely and easily recognizing the status or conditions of the respective pallets from an external portion thereof for the working system in which a number of pallets are accommodated in the pallet stocker in a multiple stage.

For example, when it is required to display the status or conditions of the pallets in the loop-type pallet stocker of flat arrangement type, since the pallet display section is arranged in a row, the recognition or distinction is made difficult in correspondence to the pallet, and the power of visual recognition is not good. Moreover, in order to confirm the pallet condition except the preparation completion, it is necessary to visually confirm the condition in combination of the confirmation of the display on the CRT of the control unit of the machining center located apart from the pallet display section. Still furthermore, since the display on the CRT displays the recognition of the pallet status generally through characters or letters, the recognition is not made easily and clearly, and moreover, such display further includes limits for displaying the numbers of the pallets on one display surface. Thus, accordingly, with respect to a large stocker number of pallets, further search or page turning operation will be required.

In addition, the system controller such as host computer is operated in response to complicated software concerning working scheduled control, working program, tool management, instructions on the conveying unit, instructions on the machining center and the like, and the pallet displaying is also performed by a portion thereof, so that there is lacking in real time operation in auxiliary functions. Moreover, since the system controller is usually installed in the computer apart from the pallet stocker, it is difficult for an operator to instantaneously grasp the matching with an actual object.

SUMMARY OF THE INVENTION

An object of the present invention is to substantially eliminate the problems or defects encountered in the prior art described above and to provide an operation control apparatus of a working system having a simple control system structure and being capable of shortening an access time and an operation cycle time, executing a self-diagonosis of troubles in respective units or devices totally in a control unit in a machining center, and executing a pallet interruption instruction during a scheduled operation. The apparatus being further provided with a pallet status display unit for easy distinction of the status of the respective pallets from an external position.

This and other objects can be achieved according to the present invention by providing an operation control apparatus of a working system which comprises a machining center numerically controlled, a pallet stocker disposed in the vicinity of the machining center and accommodating a number of pallets therein, a preparatory station for setting-up a work on a pallet, a conveying unit for automatically conveying the pallet from the pallet stocker to the preparatory station or the machining center, and a control apparatus for controlling an operation of the working system. The operation control apparatus comprises:

a control unit provided for the machining center and including a numerically controlled (NC) section executing instructions regarding a working schedule table display, a working schedule table edition, a scheduled operation start, a calling of a next working part program, an automatic cycle start, a tool exchanging, a completion of the scheduled operation, a cutting abnormal detection, a retirement of a working pallet on an abnormality, a selection of a tool to be exchanged, and a self-diagonosis information report of a machine. The apparatus includes a MPU section executing a schedule data management such as rewriting of pallet existing data and rewriting of schedule data, a sequence operation completion information, a preparation of self-diagonosis information report, a conveying instruction to the pallets and a transmission of a status information of the apparatus further comprises:

a preparatory operation board disposed in association with the preparatory station and instructing a pallet interruption conveyance instruction and preparation completion and vacant pallet return information;

a control board operatively connected to the control unit provided for the machining center and adapted to receive the conveying instructions to the pallets and the pallet status information, to transmit the pallet status displaying instruction and the pallet conveying operation execution instruction in accordance with the instruction regarding a pallet interruption conveyance and the preparation completion and vacant pallet return information from the preparatory operation board and to execute information of the pallet conveyance completion, the pallet existing data and the self-diagonosis report with respect to the MPU section of the control unit; and a movable control board provided in association with the conveying unit and adapted to receive the conveying operation execution instructions and to inform of an operation condition of the conveying unit to the control board.

The operation control apparatus further comprises a pallet status display unit disposed in association with the control board and adapted to distinguish and display the status of the respective pallets in response to pallet status display instructions from the control board. The pallet status display unit includes display lamps each corresponding in position to an accommodation position of each of the respective pallets in the pallet stocker and distinguishes the status of the respective pallets independently in accordance with illumination of lighting colors of the display lamps or in combination of lighting or flashing of the display lamps.

According to the operation control apparatus of the present invention having the characteristics described above, the automatic pallet conveying unit as well as the machining center can be effectively controlled through the control unit disposed in association with the machining center for controlling the same, the control board operatively connected to the control unit and the preparatory station and the movable control board disposed for the conveying unit, without arranging separately a specific system controller such as host computer, thus realizing easy handling and maintenance.

Moreover, the troubles caused in the respective units or devices can be totally self-diagnosed by the control unit in the machining center, and the pallet interruption instructions can be executed during the scheduled operation to thereby easily take out a pallet in an emergency.

Furthermore, the status or conditions of the respective pallets in the pallet stocker or the machining center can be independently displayed by the pallet status display unit disposed in association with the control board. The display of the status of the pallets may be performed, for example, through the lighting or flashing of display lamps which are arranged in one-to-one correspondence to the pallets. This can be able to done through the illumination of colors such as green or red or combinations thereof.

The further natures and features of the present invention will be made further clear hereunder through descriptions with reference to the accompanying drawings.

BRIEF DESCRIPTION OF THE DRAWINGS

In the accompanying drawings:

FIG. 4 is one example of a schedule table of CRT display surface of a control unit incorporated in a machining center;

DESCRIPTION OF THE PREFERRED EMBODIMENTS

Figure 1:
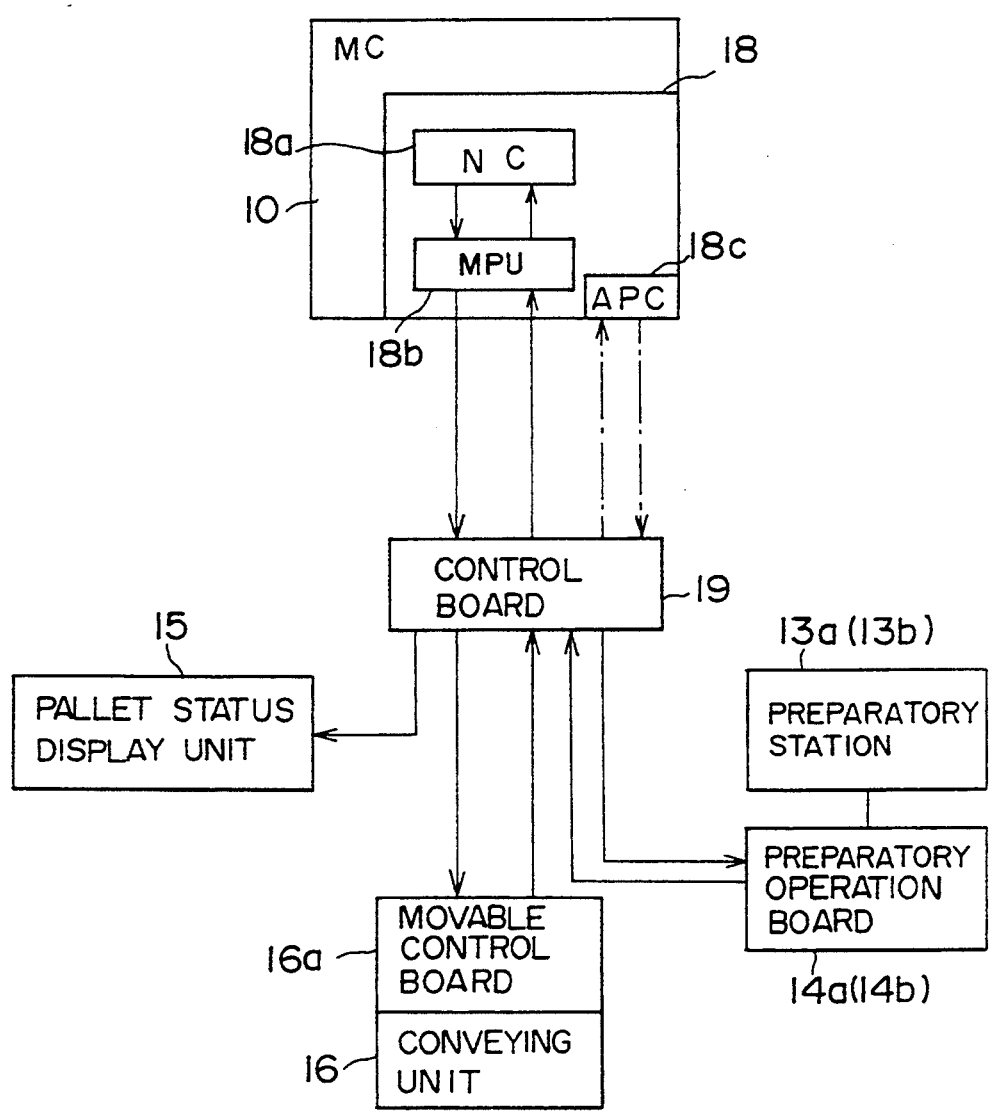
FIG. 1 is a block diagram representing one embodiment of an operation control apparatus for a working system of the present invention.
Figure 2:
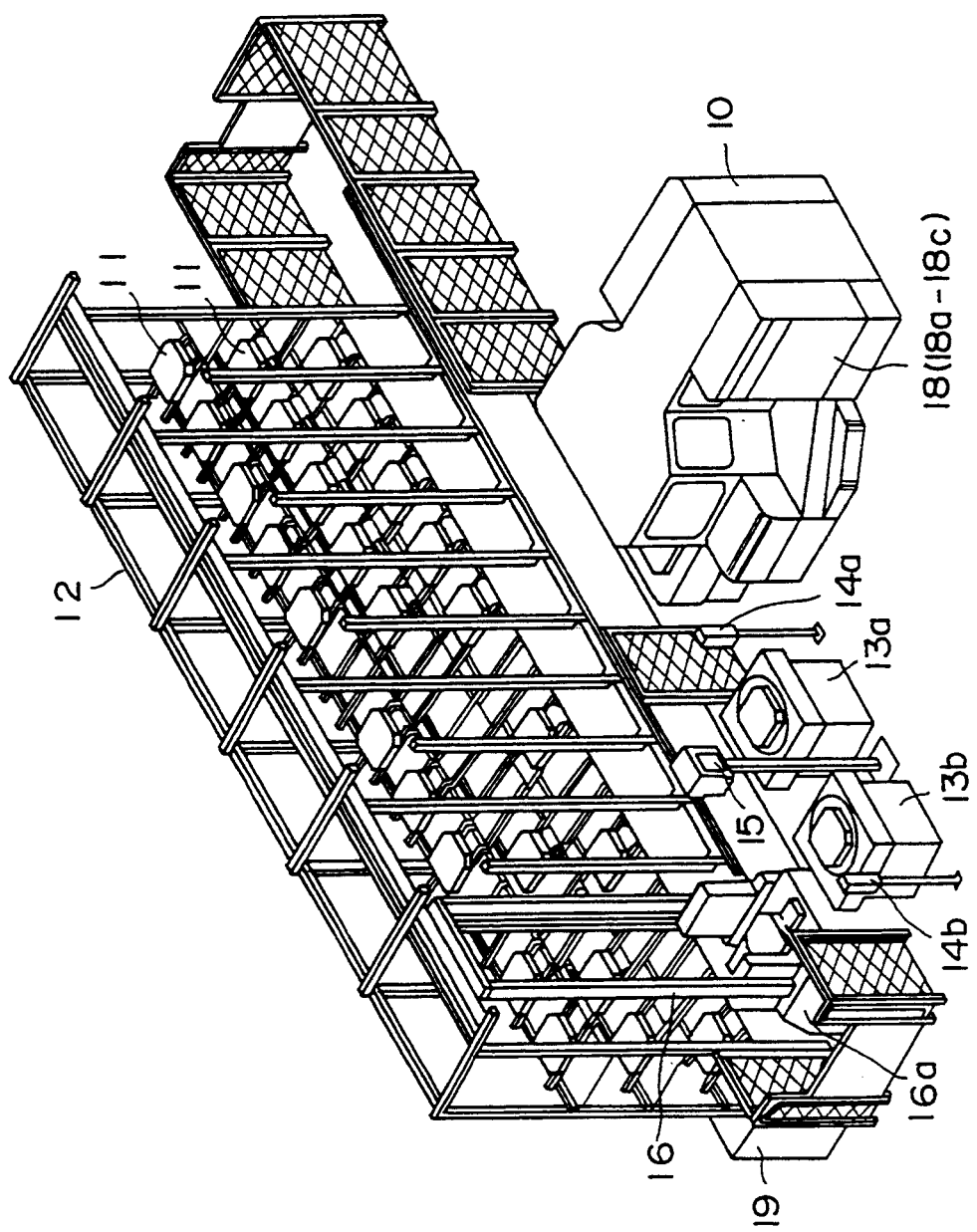
FIG. 2 is a perspective view showing an outer appearance of an entire working system for operating the operation control apparatus of FIG. 1.

FIGS. 1 to 5 represent one embodiment according to the present invention, and FIG. 2 represents the entire structure of a working system, in which a pallet stocker 12 in which a plurality of pallets 11 are stored in multiple stages is disposed behind and in the vicinity of a machining center 10, as viewed.

Two preparatory stations 13a and 13b are disposed in front of the pallet stocker 12 and on the side of the machining center, and preparatory operation boards 14a and 14b are also disposed on the sides of the corresponding preparatory stations 13a and 13b. A pallet status display unit 15 for displaying the status or conditions of the respective pallets 11 is further disposed between the preparatory stations 13a and 13b.

A conveying unit 16 such as conveying bogie for automatically taking out and conveying the pallets 11 from the pallet stocker 12 to the machining center 10 or the preparatory stations 13a and 13b is arranged to the front portion of the pallet stocker 12.

As shown in FIG. 1, inside the machining center 10, there is located a control unit 18 for controlling the machining center 10. The control unit 18 is operatively connected to a control board 19 for controlling the operations of the preparatory stations 13a and 13b, the pallet status display unit 15 and the conveying unit 16.

Signals from the preparatory operation boards 14a and 14b are inputted into the control board 19.

Control unit 18 is provided with a numerically controlling section (NC section) 18a and a MPU section 18b. Data representing a table display of the schedule, a table edition of the schedule, a scheduled operation start, an access of the next working part program, an automatic cycle start instruction, an automatic pallet exchanging instruction, a scheduled operation completion, detection of an abnormal cutting, a pallet returning, selection of a tool to be changed, self-diagonosis information display, and the like is transferred from NC control section 18a to MPU section 18b. Conversely, data representing scheduled data management such as rewriting of a pallet's existing data and rewriting of the scheduled data, sequence operation completion information, self-diagonosis information reporting data, and the like are transferred from MPU section 18b to NC control section 18a.

The pallet existing data is the data for recognizing portions of the pallets positioned in the working system (pallet stocker 12, the preparatory stations 13a, 13b, the table base of the machining center 10 and the conveying unit 18) in what states, and the data is rewritten in response to the sequence progress of the working.

Here the scheduled data management means the respective data management for the controlling of the automatic operation in response to the scheduled data set in the NC control section 18a.

The MPU section 18b transfers data representing, for example, the pallet conveying instruction and the pallet status information to the control board 19. Furthermore, the pallet interruption instruction and conveying instruction in accordance with the pallet interruption conveying function and preparation completion information (preparation completion/vacant pallet return) from the preparation operation control boards 14a and 14b are inputted into the control board. In accordance with these data, a pallet status display instruction is transmitted to the pallet status display unit 15, conveying operation execution instruction is transmitted to the conveyance control board 16a of the conveying unit 16, and the conveying instruction is transmitted to preparatory stations 13a and 13b.

In these processes, the pallet interruption conveying function means the function for carrying out the conveyance of an optional pallet from the pallet stocker 12 to the preparatory stations 13a and 13b or vice versa conveyance during a scheduled operation irrespective of whether the pallet is an objective one or one out of schedule. More particularly, thus relates to the execution of pallet interruption conveying instructions with respect to pallets out of the schedule during the scheduled operation.

Then, the operation completion information and the self-diagonosis information report are transferred from conveyance control board 16a of conveying unit 16 to control board 19, and the preparatory station status information and the self-diagonosis information report are transferred from preparatory stations 13a and 13b. In accordance with the information or reports, the pallet information completion report, the pallet existing data information and the self-diagonosis information report are outputted from control board 9 to MPU 18b of control unit 18.

APC (Automatic Pallet Changer) status information is communicated between APC section 18c in control unit 18 and control board 19. This information is also exchanged between APC section 18c and MPU section 18b.

According to the structure described above, without arranging the system controller such as host computer, each of the pallet status display unit 15 showing the status of pallets 11, the conveying unit 16 automatically conveying the pallets 11 and machining center 10, can be controlled through the control unit 18, which is provided for machining center 10 and controls the same, and the control board 19 connected to the control unit 18. Accordingly, the working system can be relatively easily operated and easily maintained.

Figure 3:
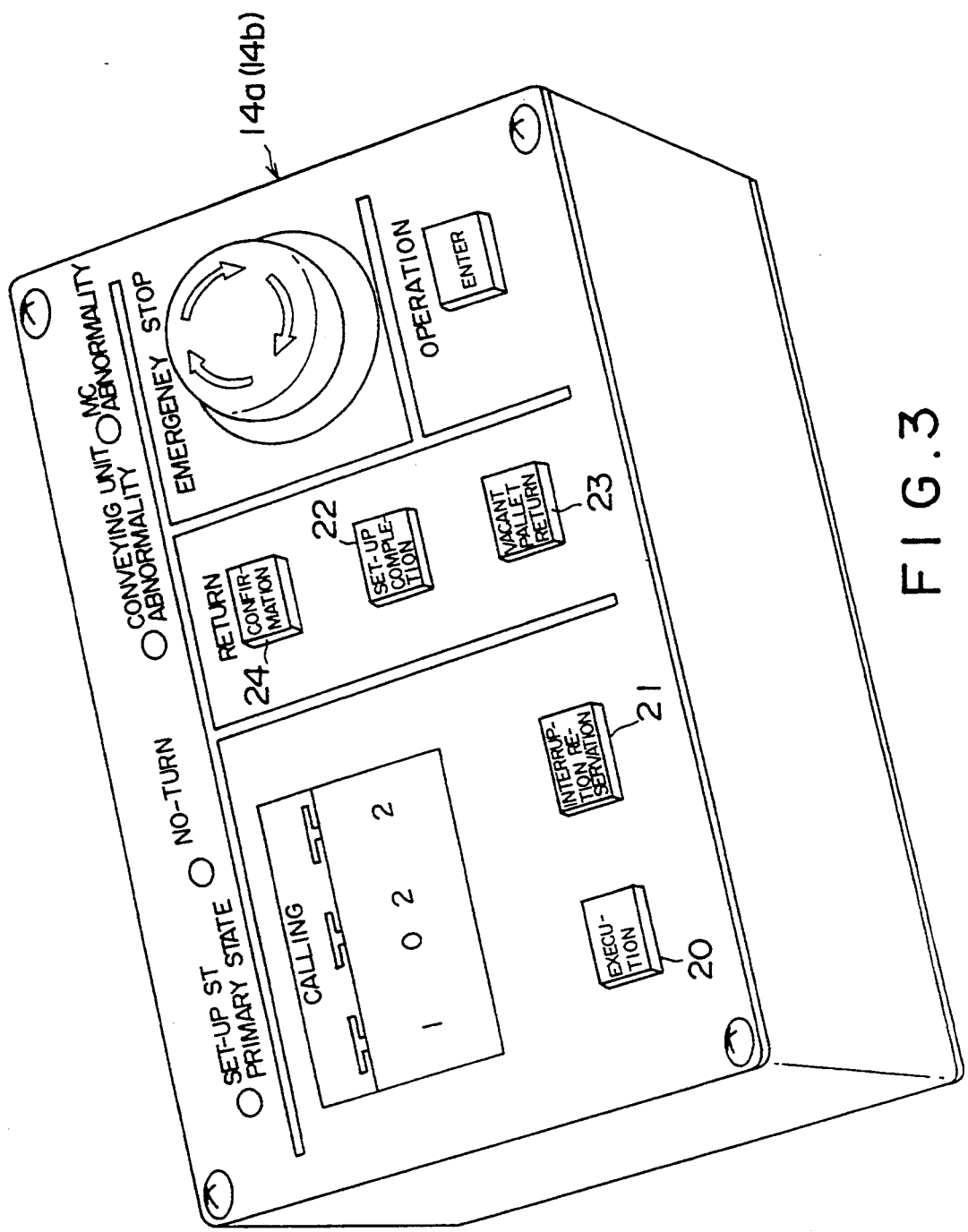
FIG. 3 is a perspective view in an enlarged scale of a preparatory board provided for the working system of FIG. 2.

FIG. 3 shows an outer appearance of the preparatory operation board 14a (14b). Referring to FIG. 3, the preparatory operation board 14a (14b) is utilized for inputting, as described hereinbefore, pallet interruption conveyance instructions and the preparation completion information (preparation completion/vacant pallet return) to control board 19. For this purpose, an execution button 20, an interruption reservation button 21, a preparation completion button 22, a vacant pallet return button 23, and a confirmation button 24 for confirming these operations are all provided for preparatory operation board 14a (14b).

FIG. 4 shows one example of a schedule table to be displayed on the picture surface of the CRT in control unit 18 of machining center 10. In this example, a pallet stocker number area 25 is disposed in the station number, and schedule data including a pallet number, a schedule number (working order), a process number and the like corresponding to the station number is registered on the screen of the CRT, thereby displaying the pallet status through the display of letters of the status numbers.

The following is one example of correspondence between the pallet status and the characters (status display) of the status numbers.

| Pallet Status | Status Display |
| --- | --- |
| Tool Damage | "A" |
| Programming Error | "NE" |
| Pallet Error | "CE" |
| First Process Working Completion | "F" |
| Working Completion | "C" |
| On Working | "M" |
| Dummy Pallet | "D" |
| Vacant Pallet | "E" |
| Preparation Completion | "S" |

For example, at the completion of the preparation, when a signal representing the preparation completion at preparatory stations 13a and 13b is inputted from preparatory operation boards 14a and 14b to control unit 18 through control board 19, the Status Display of the corresponding stocker on the schedule table on control unit 18 is displayed as the character "S". Then, control unit 18 renews subsequently the Status Display corresponding to the above status on the schedule table in accordance with the progress of the working schedule.

In these processes, it is difficult to distinguish the status of the pallets only by displaying, in letters, the pallet status on the surface of CRT of the control unit 18. In order to eliminate this difficulty, pallet status display unit 15 is arranged so as to independently display the respective pallet status.

Figure 5:
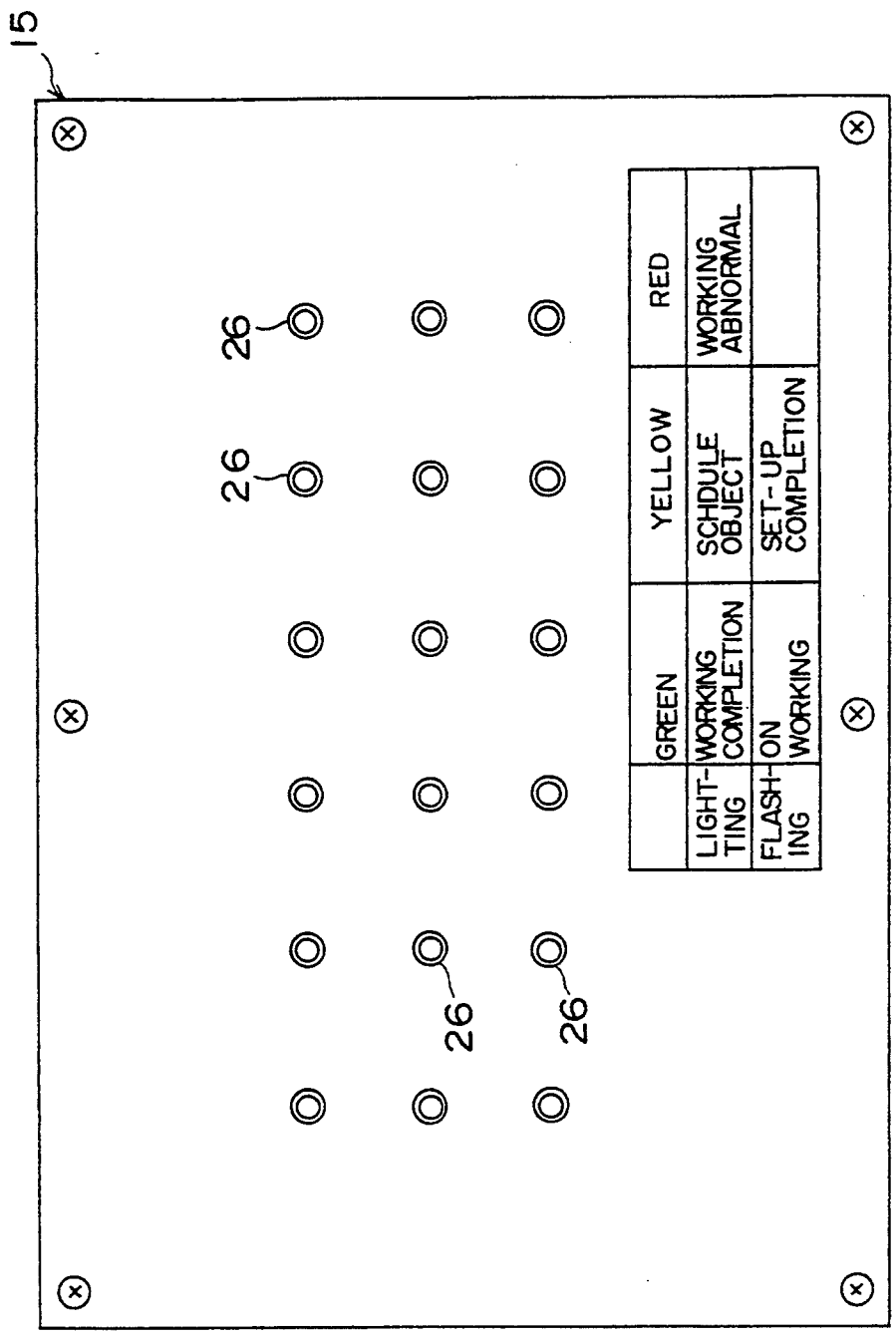
FIG. 5 is a brief front view in an enlarged scale of a pallet status display unit provided for the working system of FIG. 2.

Specifically, this pallet status display unit 15 has a structure, as shown in detail in FIG. 5, to be usable for the pallet stocker 12 for accommodating eighteen pallets 11, six in each stage, when, for example, a pallet stocker having three stages is used, and one LED lamp (display lamp) 26 is disposed for one pallet accommodation position. According to the combination of illumination colors, lighting or flashing of the these LED lamps 26, the status of the pallet 11 accommodated in a portion of the pallet stocker 12 corresponding to each LED lamp 26 is displayed.

Each of these LED lamps 26 has a structure capable of independently controlling the illuminations of two colors (green and red) by means of one device. The correspondence between the status of the respective LED lamps 26 and the status of the pallets is as follows.

| LED Lamp Status | Pallet Status |
|---|---|
| No-lighting | No Set-up |
| Green Color Lighting | Working Completion |
| Red Color Lighting | Working Abnormality |
| Green-Red Color Lighting (Yellow Color Lighting in Visual) | Working Object |
| Green-Red Color Flashing (Yellow Color Flashing in Visual) | Preparation Completion |
| Green Color Flashing | On working |

According to the above setting, the respective status or conditions of the pallets 11 now in pallet stocker 12, preparatory stations 13a and 13b and machining center 10 can be easily and surely distinguished by an operator who stands in front of the pallet stocker 12 in conformity with, for example, the preparatory conditions and the working order data set by the operator.

Figure 6:
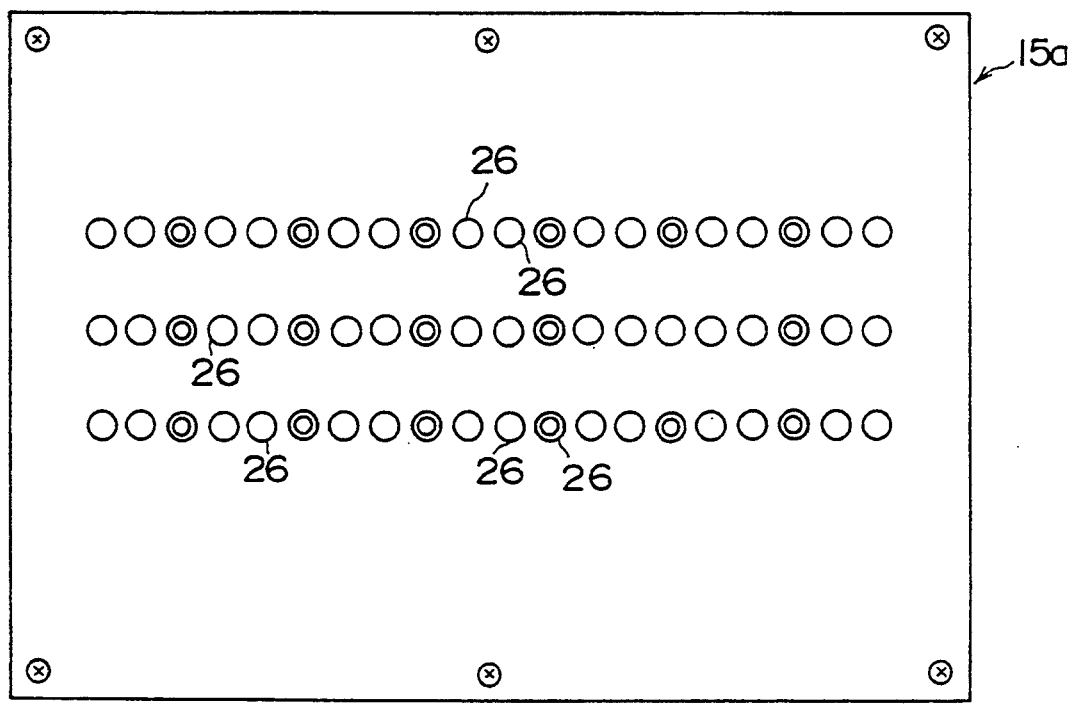
FIG. 6 is a front view of another pallet status display unit.
Figure 7:
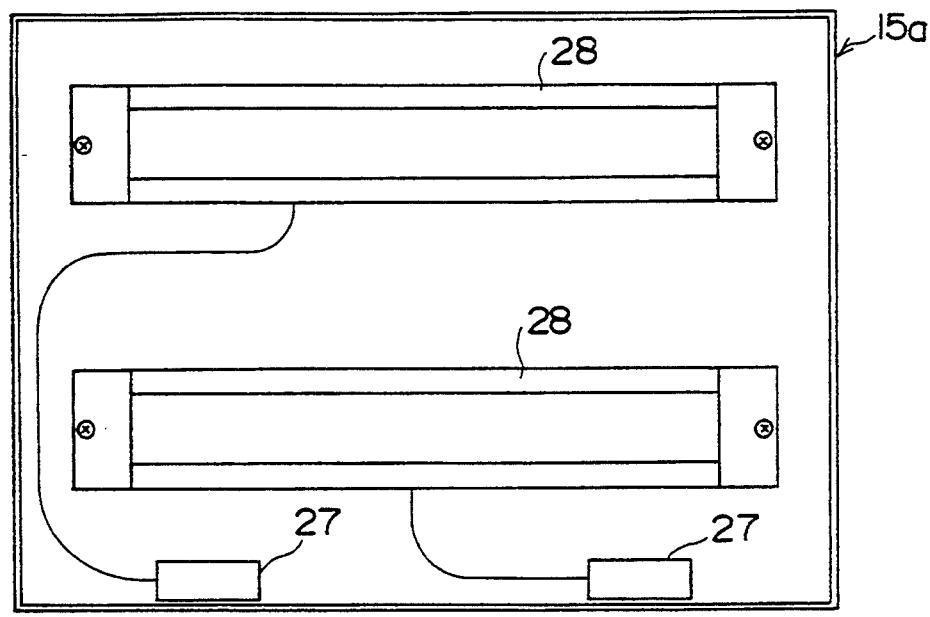
FIG. 7 is a backside view of FIG. 6.
Figure 8:
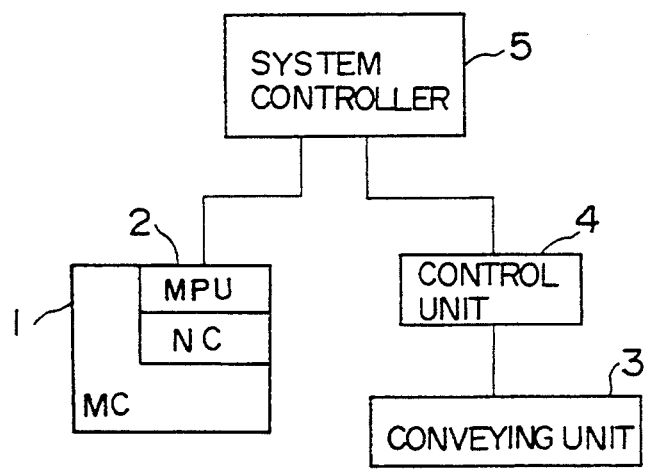
FIG. 8 is a block diagram of a conventional operation control apparatus for the working system.

FIGS. 6 and 7 are brief illustrations of a pallet status display unit 15a for displaying the respective pallet status utilized for a pallet stocker, for example, having three stages for accommodating sixty pallets, twenty in each stage.

Specifically, in the use of this pallet status display unit 15a, sixty LED lamps 26 are arranged in three stages, twenty in each stage, in conformity with sixty pallets 11 respectively accommodated in the pallet stocker 12. Each thirty LED lamps 26 corresponding to each thirty pallets 11 are electrically connected to each of two terminal blocks 28 through each of two connectors 27.

In this example, the LED lamps 26 are arranged in conformity with a maximum of sixty pallets 11, twenty in each of three stages, but in the case of less than sixty pallets, the attachment of a faceplate LED and the wiring between the terminal blocks may be changed.

What is claimed is:

1. An operation control apparatus of a working system which comprises a machining center numerically controlled, a pallet stocker disposed in the vicinity of the machining center and storing a number of pallets therein, a preparatory station for setting-up a work on a pallet, a conveying unit for automatically conveying the pallet from the pallet stocker to the preparatory station or the machining center, and a control apparatus for controlling an operation of the working system, said operation control apparatus comprising:

a control unit provided for the machining center and including a numerically control (NC) section executing instructions regarding a working schedule table display, a working schedule table edition, a scheduled operation start, a calling of a next working part program, an automatic cycle start, a tool exchanging, a completion of the scheduled operation, a cutting abnormal detection, a retraction of a working pallet on an abnormality, a selection of a tool to be exchanged, and a self-diagonosis information report of a machine and further including a Micro Processor Unit (MPU) section executing a schedule data management concerning rewriting of pallet existing data and rewriting of schedule data, a sequence operation completion information, a preparation of self-diagonosis information report, a transmission of conveying instructions to the pallets and a status information of the pallet;

a preparatory operation board disposed in association with the preparatory station and instructing a pallet interruption conveyance instruction and preparation completion and vacant pallet return information;

a control board operatively connected to the control unit and adapted to receive the conveying instructions to the pallets and the pallet status information, and to transmit the pallet status displaying instructions and the pallet conveying operation execution instructions on the basis of each information of a pallet interruption conveyance and the preparation completion and vacant pallet return from the preparatory operation board and to transmit each report of the pallet conveyance completion, the pallet existing data and the self-diagnosis to the MPU section of the control unit; and a movable control board provided in the conveying unit and adapted to receive the conveying operation execution instructions and to transmit an operation condition of the conveying unit to the control board.

2. The operation control apparatus according to claim 1, said operation control apparatus further comprising a pallet status display unit disposed in the control board and adapted to distinguish and display the status of the respective pallets in response to the pallet status display instructions from said control board.

3. The operation control apparatus according to claim 2, wherein said pallet status display unit includes display lamps each corresponding to a storage position of each respective pallets the pallet stocker and distinguish the status of the respective pallets independently in response to illumination of lighting colors of the display lamps or in combination of lighting or flashing of the display lamps.

* * * * *